2,894,102

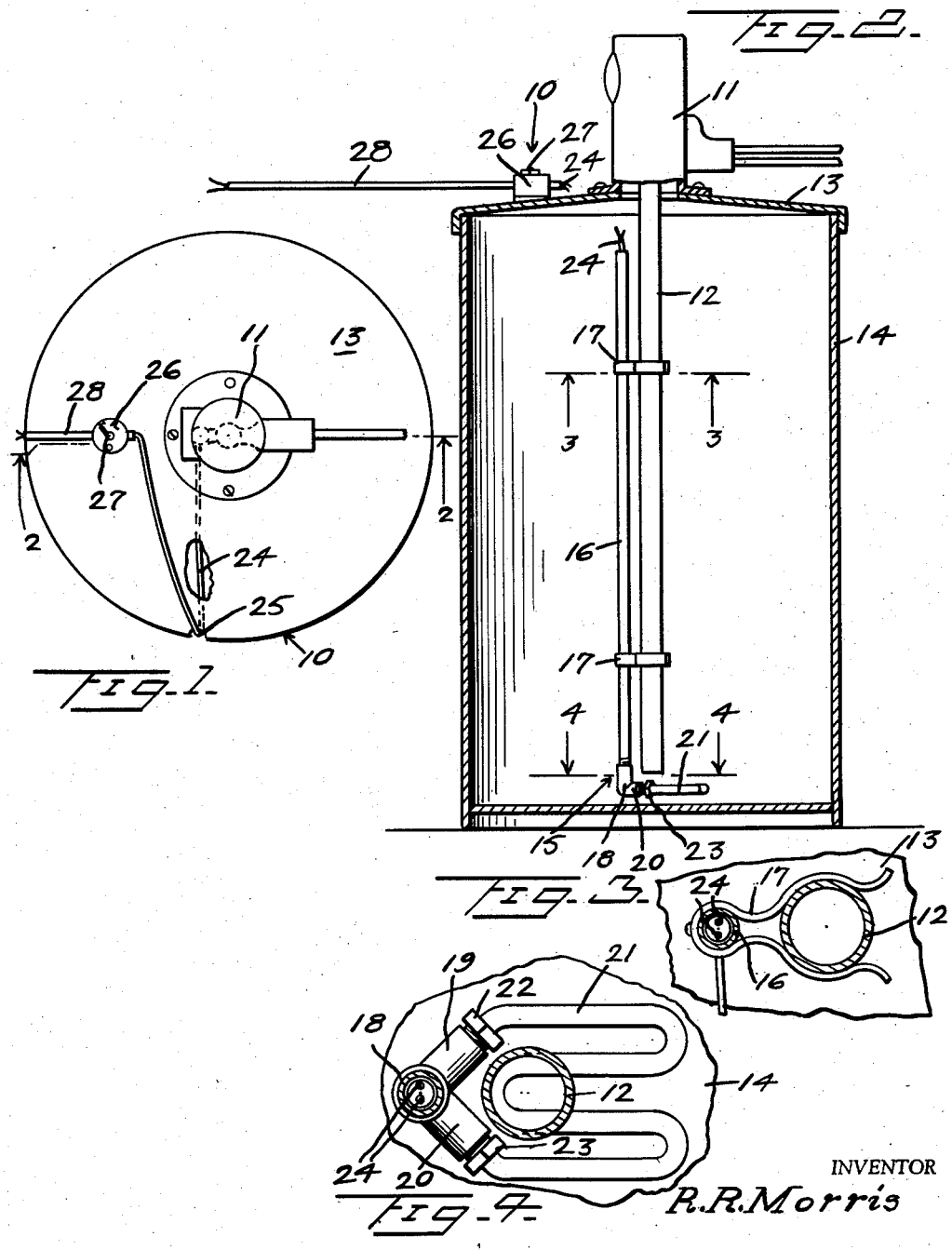

GREASE DISPENSER HEATER

Ray R. Morris, Portland, Oreg.

Application June 7, 1957, Serial No. 664,234

1 Claim. (Cl. 219—19)

The present invention relates to grease dispenser heaters, and more particularly to a device for heating grease to enable it to be dispensed in cold weather.

The primary object of the invention is to provide a grease dispenser heater which can be detachably connected to the dispenser pipe to permit the grease to be heated as desired.

Another object of the invention is to provide a grease dispenser heater wherein the heating members are electrically energized and controlled from a remote point.

A further object of the invention is to provide an electric heater for grease dispensers which is inexpensive to manufacture, simple to use, and which is effective in heating the grease prior to the dispensing action.

Other objects and advantages will become apparent in the following specification when considered in the light of the attached drawings, in which:

Figure 1 is a top plan view of the invention shown partially broken away and in section for convenience of illustration.

Figure 2 is a vertical cross-section taken along the line 2—2 of Figure 1, looking in the direction of the arrows.

Figure 3 is an enlarged fragmentary horizontal section taken along the line 3—3 of Figure 2, looking in the direction of the arrows.

Figure 4 is an enlarged fragmentary horizontal cross-section taken along the line 4—4 of Figure 2, looking in the direction of the arrows.

Referring now to the drawings in detail wherein like reference characters indicate like parts throughout the several figures, the reference numeral 10 indicates generally a grease dispensing device with which the invention is used.

Under normal conditions a grease dispenser 10 includes an electric pump 11, an elongated grease dispensing pipe 12 depending therefrom, a cover 13, and the grease barrel 14 on which the cover 13 rests with the dispensing pipe 12 immersed in the grease in the barrel 14.

The grease in the barrel 14 is normally sold to the place of use in the barrel 14, and the dispenser 10 is moved from barrel to barrel as they become empty. Oftentimes the barrels 14 are stored in extremely cold rooms and must be moved to warm storage several days before dispensing can take place therefrom due to the consistency of the grease. Such double handling is undesirable and the present invention eliminates its necessity.

The grease heater, indicated generally at 15, comprises an elongated conduit 16 having a pair of spring clamps 17 secured thereon in vertically spaced relation. The spring clamps 17 are adapted to engage over the grease dispensing pipe 12 to mount the conduit 16 in spaced parallel relation thereto. The conduit 16 is provided at its lower end with a fitting 18 having angularly related branches 19, 20 extending outwardly therefrom. A "Calrod" heating element 21 has its opposite ends secured to the branches 19, 20, respectively, by threaded bushings 22, 23.

Electric wires 24 are connected to the "Calrod" heating element 21 and extend upwardly through the conduit 16. The wires 24 extend through a notch 25 in the peripheral edge of the cover 13 and on to a control switch 26 having a manually controlled lever 27 thereon for adjusting the heat range of the "Calrod" heating element 21. Wires 28 extend from the control 26 to a source of electric energy.

In the use and operation of the invention, the control switch 26 is adjusted by the hand lever 27 to control the temperature range of the "Calrod" element 21 so as to heat the grease in the barrel 14 sufficiently to render it easy to pump through the dispenser pipe 12 as needed.

It should be noted that the "Calrod" element 21 is positioned immediately beyond the inlet end of the dispenser pipe 12 so that the grease is forced to pass closely by the "Calrod" element 21 as it is moved into the dispenser pipe 12.

Obviously, automatic controls for the "Calrod" element 21 may be used when warranted.

While I have disclosed a specific spring clamp 17, it should be understood that any form of clamp may be used as well as direct connections and the clamp 17 can be varied in size to fit grease pipes 12 of different sizes.

Having thus described the preferred embodiment of the invention, it should be understood that numerous structural modifications and adaptations may be resorted to without departing from the scope of the appended claim.

What is claimed is:

A portable grease heating grease dispensing attachment for grease barrels comprising a portable cover adapted to be detachably supported on said grease barrel, a grease pump mounted on said cover, an elongated dispenser pipe depending vertically from said pump and said cover to extend into the grease in said barrel, said elongated dispenser pipe having a grease inlet opening at the lower end thereof, an elongated electrical conduit extending generally parallel to said pipe, one end of said conduit being connected to a source of electrical energy, a pair of diverging branches connected to the other end of said conduit, a pair of vertically spaced spring clamps secured to said conduit and detachably engaging said grease dispenser pipe, a substantially W-shaped electric resistance heater having a pair of spaced free ends, said free ends of said heater being connected to said branches of said conduit to support said heater on the lower end of said conduit in laterally extending relation underlying the lower end of said pipe, whereby grease adjacent the lower inlet end of said pipe is heated to facilitate easy flow thereof.

References Cited in the file of this patent

UNITED STATES PATENTS

| | | |
|---|---|---|
| 1,675,689 | Biggs | July 3, 1928 |
| 1,866,986 | Pingrey | July 12, 1932 |
| 1,969,760 | Reynolds | Aug. 14, 1934 |
| 2,091,838 | Staak | Aug. 31, 1937 |
| 2,123,604 | Johnson | July 12, 1938 |
| 2,201,901 | Keen | May 21, 1940 |
| 2,289,981 | McDonald | July 14, 1942 |
| 2,362,680 | Troupe | Nov. 14, 1944 |
| 2,477,363 | Danner | July 26, 1949 |
| 2,781,851 | Smith | Feb. 19, 1957 |